(12) United States Patent
Bird et al.

(10) Patent No.: US 6,615,214 B1
(45) Date of Patent: Sep. 2, 2003

(54) ACCOMMODATION OF DATA DEFINITION STATEMENTS IN THE SHARING OF DYNAMIC SQL STATEMENTS

(75) Inventors: Paul M. Bird, Toronto (CA); Yuk-kuen Chan, Scarborough (CA); Michael J. Snowbell, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 09/614,358

(22) Filed: Jul. 12, 2000

(30) Foreign Application Priority Data

Dec. 22, 1999 (CA) ............................................. 2293059

(51) Int. Cl.[7] ............................................... G06F 17/00
(52) U.S. Cl. ........................................ 707/100; 707/3
(58) Field of Search .............................. 707/1, 2, 3, 4, 707/5, 100, 101, 102, 103

(56) References Cited

U.S. PATENT DOCUMENTS

| | | | | |
|---|---|---|---|---|
| 5,717,911 A | * | 2/1998 | Madrid et al. ................. | 707/2 |
| 6,009,271 A | * | 12/1999 | Whatley ......................... | 717/2 |
| 6,105,033 A | * | 8/2000 | Levine ......................... | 707/101 |
| 6,374,257 B1 | * | 4/2002 | Guay et al. ..................... | 707/4 |

* cited by examiner

*Primary Examiner*—Kim Vu
*Assistant Examiner*—Isaac Woo
(74) *Attorney, Agent, or Firm*—Sawyer Law Group LLP

(57) ABSTRACT

A relational database management system which determines the shareable status of an executable object (section) in an cache. The shareable status is defined for a section in a cache by the system maintaining an identification list which has reference to database entities which are affected by a statement in the current unit of work. When a statement is compiled, the compiler generates a list of dependencies, which list is compared with the identification list. If the statement data dependencies are on the identification list, the statement will be treated as non-shareable until the completion of the current unit of work.

17 Claims, 3 Drawing Sheets

ACCOMMODATION OF DATA DEFINITION STATEMENTS IN THE SHARING OF DYNAMIC SQL STATEMENTS

FIELD OF THE INVENTION

The present invention is directed to an improvement in computing systems and in particular to computer systems which provide for accommodation of data definition statements in the sharing of dynamic SQL (Structured Query Language) statements.

BACKGROUND OF THE INVENTION

In relational DBMSs, such as the DB2Ô database, an SQL statement is compiled into an executable object which contains the logic needed to satisfy the SQL statement. In DB2 such executable objects are referred to as sections. It is known to use an SQL.cache to store the compiled SQL statements (the sections) to permit reuse of compiled SQL statements. This permits SQL statements to be used without the need to recompile the statements, but only where the compilation environment and the system catalog information is unchanged. This reuse may be by the application initially using the SQL statement (resulting in the initial compilation of the SQL statement) or by any other application with the same statement text and compilation environment (such a reuse by another application is a sharing of the compiled SQL statement).

In general terms, the compilation environment is described as being the context of the SQL request. The compilation environment includes the information which can affect the final form of the executable objects generated by the compiler. The information potentially found in the compilation environment information includes such items as the isolation level requested, the requested query optimization level, the codepage of the requesting application, and other information which affects the executable objects and which is known to those skilled in the art. The system catalog information in a relational DBMS typically contains information about how the data in the relational database is structured. Table definition information such as the number of columns, the column type, and index information are examples of the type of information typically maintained in the system catalogue information. In relational DBMSs, it is common to have system catalogue information stored as tables in each database, these are sometimes referred to as catalogue tables or system tables.

Typically in DBMSs the compilation, including optimisation, of SQL statements is a costly step in processing the SQL statement and therefore the reuse of compiled sections has a significant impact on the efficiency of the DBMS. The caching of SQL sections (executable objects) is particularly useful in the case of dynamically generated SQL. In systems such as DB2, which permit the reuse of compiled SQL statements, it is important that the reused executable objects are not reused when changes have been made to the compilation environment or system catalogue tables such that the stored executable object is no longer a valid representation of the SQL statement.

To prevent such inappropriate reuse, it is known to remove from the cache those executable objects created in a unit of work after a data definition language (DDL) statement has been executed. The DDL may potentially change the system catalogue information such that the stored compiled version of the SQL statement may no longer be valid as a reusable equivalent of the SQL statement. Similarly, after a DDL statement has been issued, prior art systems prevent other applications from sharing any sections added to the cache by the application using the DDL statement until the DDL statement is committed.

It is therefore desirable to have a DBMS which permits, under the appropriate circumstances, executable objects to be shared rather than excluding them from being shared when added to the cache by an application in a unit of work after the execution of a DDL statement

SUMMARY OF THE INVENTION

According to one aspect of the present invention, there is provided an improved system for the accommodation of DDL statements in the sharing of dynamic SQL statements.

According to another aspect of the present invention, there is provided an SQL relational database management system including an SQL cache for the storage of sections corresponding to SQL statements, the relational database management system further including an identification list for a current unit of work for an application, the identification list storing database entity identifiers corresponding to database entities altered by DDL statements issued in the current unit of work, an SQL cache manager for identifying and marking the SQL sections compiled after the issuing of DDL statements in the current unit of work which are non-shareable with other applications during the current unit of work, where the shareable status of an SQL statement is determined by comparing data dependencies returned by the compiler for the SQL statement with the database entities found on the identification list. The SQL cache manager provides functionality specific to the SQL cache and may be implemented in different components of the system.

According to another aspect of the present invention, there is provided the above system, further comprising an application list for the current unit of work, the application list comprising entries corresponding to SQL sections added to the SQL cache which are non-shareable.

According to another aspect of the present invention, there is provided the above system in which each entry in the application list further comprises a reference to the current active savepoint.

According to another aspect of the present invention, there is provided the above system in which the SQL cache manager is responsive to a savepoint rollback to remove from the SQL cache all entries on the application list added after the savepoint is responsive to a unit of work rollback to remove from the SQL cache all entries on the application list, and in which the SQL cache manager is responsive to a work commit to make shareable all entries on the application list.

According to another aspect of the present invention, there is provided a computer program product for use with a computer comprising a central processing unit and random access memory, said computer program product comprising a computer usable medium having computer readable code means embodied in said medium providing for the determination of shareable sections in an SQL cache in an SQL relational database management system, the computer program product including computer readable program code means for implementing the above system.

Advantages of the present invention include the ability to share more sections found in the SQL cache and to therefore increase the efficiency of SQL relational DBMSs.

BRIEF DESCRIPTION OF THE DRAWINGS

The preferred embodiment of the invention is shown in the drawings, wherein.

Figure 1:
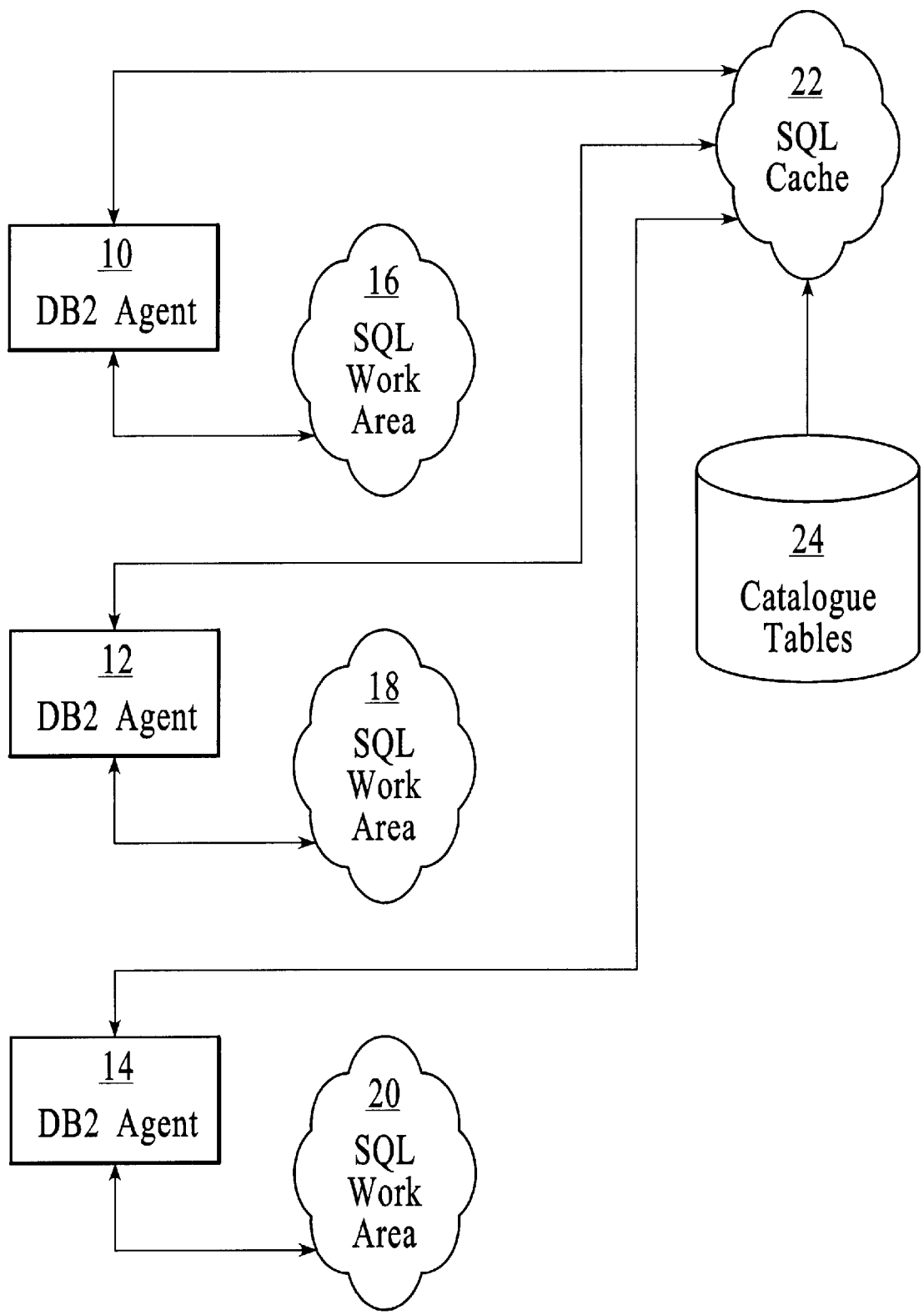
FIG. 1 is a block diagram showing an example arrangement of different SQL statement memory components.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION

FIG. 1 is a block diagram showing an example arrangement of different SQL statement memory components. FIG. 1 shows agents 10, 12, 14, each with an associated SQL work area, 16, 18, 20, respectively. As FIG. 1 shows, each of agents 10, 12, 14 is able to reference SQL cache 22. Also shown in the figure is the collection of DBMS catalogue tables 24. This is used to store information relating to the structure of the database. The DBMS of the preferred embodiment is DB2Ô.

Figure 2:
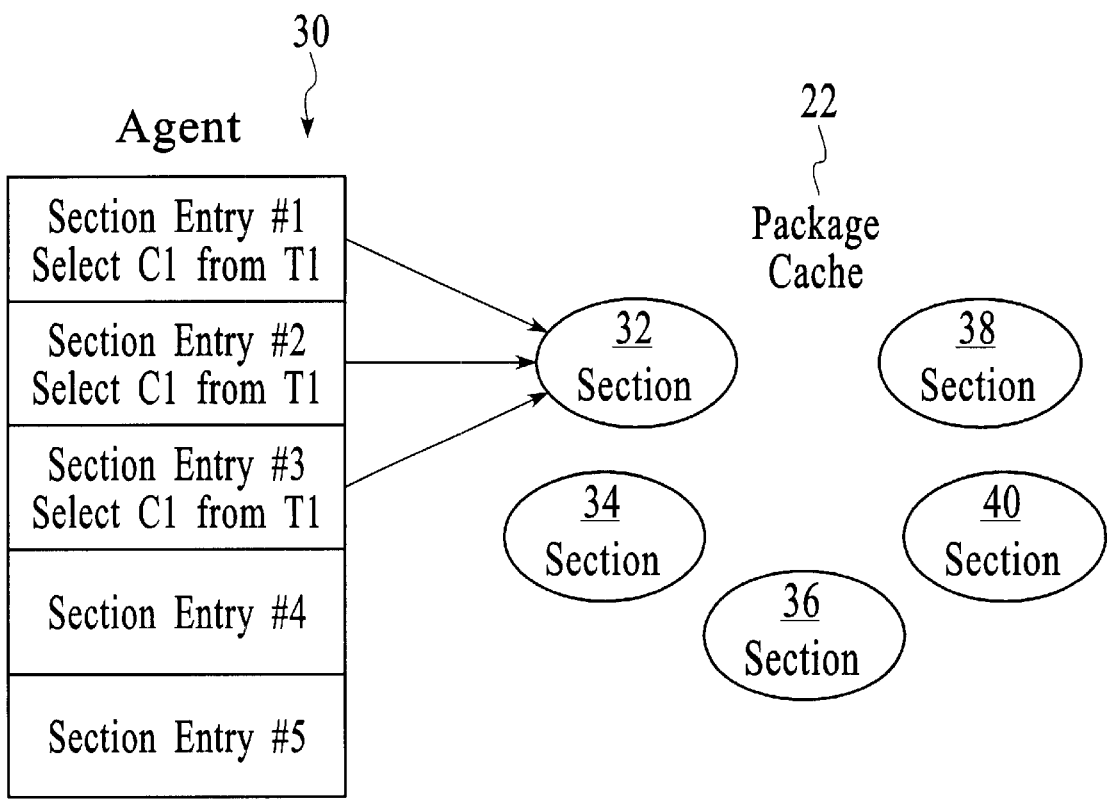
FIG. 2 is a block diagram showing the arrangement of sections within an example SQL cache.
Figure 3:
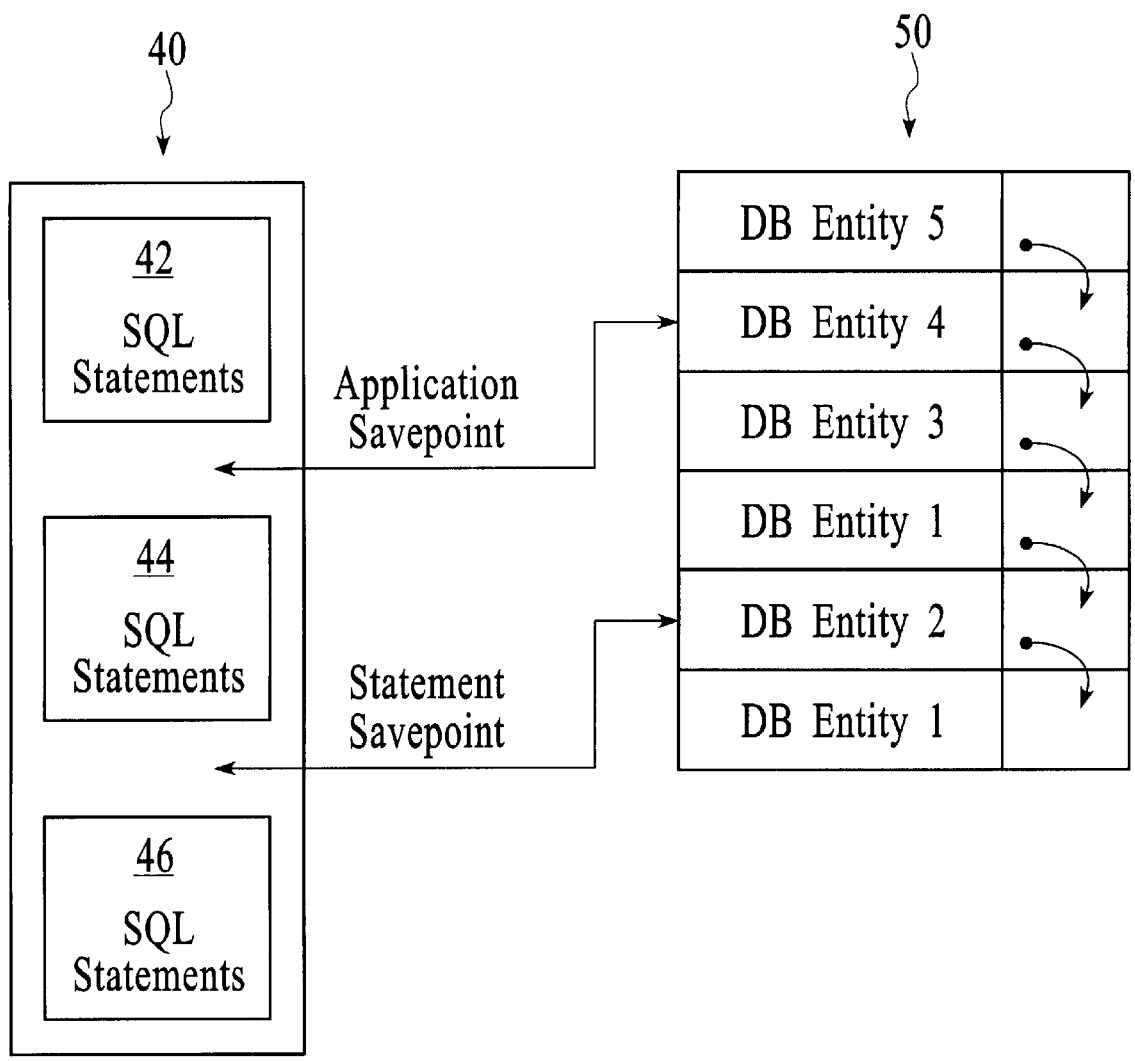
FIG. 3 is a block diagram showing a schematic representation of blocks of SQL statements for caching in the system of the preferred embodiment, and an associated identification list.

FIG. 2 shows SQL cache 22 and agent 30. Agent 30 is shown as containing five SQL section entries. FIG. 2 also shows sections 32, 34, 36, 38, 40, which are stored within SQL cache 22. FIG. 2 illustrates that SQL statements in an agent may reference the same section stored in the SQL cache. In the example of FIG. 2, the first three section entries all have the same SQL statement (SELECT C1 FROM T1) and thus all reference section 32 in SQL cache 22. In effect, each SQL statement compiles to the same executable object, represented in FIG. 2 by section 32. FIG. 3 is a block diagram showing unit of work 40 containing SQL statement blocks 42, 44, SQL statement 46, and associated application savepoint and statement savepoint. FIG. 3 also includes associated identification list 50. As is shown in FIGS. 1 and 2, in relational DBMS systems such as DB2Ô it is advantageous to provide a mechanism such as SQL cache 22 for retaining compiled executable objects derived from SQL statements. In the example of FIG. 2, SQL cache 22 includes sections 32, 34, 36, 38, 40. These sections are available for reuse when the SQL statement text and compilation of the request are identical to an existing cached dynamic SQL statement. Similarly, other applications (with other agents) will be able to share the section where the SQL statement text and compilation of the request are identical to an existing cached dynamic SQL statement.

In such a case, the compilation environment for the section must be the same as the compilation environment for the SQL statement. The compilation environment is those elements that affect the nature and result of the SQL compiler processing for an SQL statement. The compilation environment includes such elements as the statement context, the application codepage, special registers, the use of a default qualifier and the use of implicit function resolution. Data reflecting the compilation environment of dynamic SQL statements is stored in the SQL cache. In this example DBMS, the text of the SQL statement compiled is stored in the SQL cache. Associated with the text of the SQL statement is a set of data reflecting the compilation environment for the executable object corresponding to the SQL statement. In this way, the text of an SQL statement may have multiple compilation environment data stored and for each stored compilation environment data, a corresponding executable object, all stored in SQL cache 22.

With reference to FIG. 1, the system of the preferred embodiment is designed to have SQL processing for an agent take place in the SQL work area for the agent. In the example of FIG. 1, agent 10 has associated SQL work area 16. As an example, upon receipt of a new SQL statement from an application (an SQL request), agent 10 searches SQL work area 16 for a package or section matching a package or section corresponding to the new SQL request. If there is no match found, the system of the preferred embodiment attempts to find a match in SQL cache 22. If there is no match in SQL cache 22 then catalogue tables 24 are accessed and the statement is compiled. The SQL statement text, the compilation environment data and the section for the new SQL request are loaded into SQL cache 22 and a working copy is placed in SQL work area 16.

For dynamic SQL statements, the search in the SQL cache is made using the text of the SQL statement. If a statement entry with identical text is found in the cache, then the stored set of compilation environment data for the statement is searched for a match between the stored compilation data and the compilation environment for the statement entry of the new SQL request. If no matching compilation environment data is found then new compilation environment data is added to the set for the statement in SQL cache 22 and the SQL compiler is called to generate the executable object for use and storage in SQL cache 22.

In the system of the preferred embodiment, SQL statements are compiled on the basis of units of work. A unit of work is generally defined to be the SQL statements between COMMIT or ROLLBACK statements (or between a first connect to the database and a COMMIT or ROLLBACK statement). SQL provides a savepoint mechanism to divide units of work into logical subunits or components. A savepoint is a defined reference point in a unit of work. Where SQL requests are carried out in a unit of work and it is determined that the database has been modified in an undesirable way it is possible to rollback the system to a savepoint.

It is known to define both application savepoints and statement savepoints. A statement savepoint is generated by a DBMS and references the commencement of an SQL statement. This is shown in FIG. 3 where statement 46 has a statement savepoint referencing the commencement of that statement. Where it is determined that a statement is to be rolled back, the statement savepoint provides the reference point to which the system will be rolled back in undoing the statement. Similarly, an application savepoint may be defined by a DBMS user. This permits a user to rollback the database to the point defined by the application savepoint which the user has defined in the unit of work. An example application savepoint is shown in FIG. 3 between SQL statement block 42 and block 44. The example is typical of where a user is making changes to a database and the statements in block 44 are carried out on the understanding that the system may need to be rolled back to its state as of the end of block 42.

In SQL systems it is often convenient to differentiate between Data Manipulation (DML) SQL statements which affect user data (i.e. SELECT, INSERT, UPDATE, DELETE) and Data Definition (DDL) statements which affect system information (i.e. CREATE, ALTER, DROP).

A major obstacle to the sharing of dynamic DML between applications is knowing whether or not a statement can be shared with other applications when that statement is compiled in a unit of work after a DDL statement has been executed in that unit of work. A DDL statement can modify the structure of the tables in the database and hence a portion of the catalogue tables. Such changes may affect the executable section generated for any subsequent DML statement which references a modified database entity. For this reason, the lookup of a dynamic SQL statement in SQL cache 22 may suggest the sharing of a corresponding stored section is possible when in fact the change made to catalogue tables 24 means that the stored section in SQL cache 22 is no longer valid. To prevent such a potential misuse, prior art systems make unavailable for sharing by other applications, any sections in the SQL cache which are added after the execution of a DDL in a unit of work, until the unit of work is completed. Once the unit of work is completed, the changes to the catalogue tables are made available to all applications using the database. Before the end of the unit of work, however, the changes made by the DDL are effectively hidden from other applications.

For this reason, in the prior art, any executable sections generated by an application after a DDL statement in a unit of work cannot be shared with other applications until that unit of work is ended.

In the system of the preferred embodiment, however, it is possible to determine whether an executable section refers to a modified database entity or not. In contrast to the prior art systems, where all dynamic SQL statements compiled in a unit of work after a DDL statement was executed were treated as not being shareable, the preferred embodiment system determines whether the section generated for a dynamic SQL statement references any database entity affected by preceding DDL statements in the unit of work. As a result the system of the preferred embodiment can make available certain sections for sharing with other agents, even before the end of the unit of work.

The potential sharing of dynamic SQL statements between agents when DDL statements are active in the environment is therefore increased. This increased sharing leads to reduced resource consumption and response time for dynamic SQL statements as the need to compile SQL statements is reduced.

The system of the preferred embodiment maintains an identification list of modified database entities within each unit of work. This list is shown as identification list 50 in FIG. 3. The identification list is maintained in the catalogue tables data. Each DDL statement that modifies a database entity such that the compilation of subsequent SQL statements may be affected, adds a new entry to the identification list of modified entities kept at the catalogue node. As shown in FIG. 3, in the preferred embodiment, identification list 50 is implemented as a LIFO linked list with duplicate entries allowed (in FIG. 3, database entity 1 is shown twice in identification list 50). Duplicate entries are allowed as multiple DDL statements can affect the same database entity but some of the effects can be removed should there be a savepoint rollback.

As is shown in FIG. 3, separate pointers in identification list 50 are used to track those changes caused within a statement savepoint and an application savepoint. In FIG. 3, the statement savepoint is shown pointing to database entity 4 in identification list 50, and application savepoint is shown as pointing to database entity 2. When a savepoint is defined, the appropriate pointer is set to the most recent entry in the list; any entry after it is considered to have been added after the savepoint. In the example of FIG. 3, the SQL statement 46 is shown affecting database entity 5 at the top of identification list 50. Similarly, SQL statements in block 44 affect database entities 1, 3, 4 and 5.

After each DML statement is compiled, a list of dependencies for the generated section returned by the compiler of the preferred embodiment is compared to the list of modified database entities (identification list 50). If a match is found, the section is not shareable with other applications until the unit of work is completed; if no match is found, it is shareable with other applications. However, it is to be appreciated that those sections not affected by the DDL statement's impact on the catalogue tables are marked as shareable and so the pool of available sections for sharing in SQL cache 22 is potentially larger than would otherwise be the case.

When an SQL statement is found to be non-shareable by reference to identification list 50, the corresponding section is added to an application list of non-shareable sections. A separate indicator is kept in each entry added to identify if the entry was added within the scope of an application savepoint; this indicator is set to the identifier of the current active savepoint, if any exist. The completion of a unit of work in the system of the preferred embodiment may be defined by the execution of the COMMIT WORK statement. This causes each entry on the application list of non-shareable sections to be made available to other applications. Once the unit of work is completed, the effects of the DDL upon which the DML statements in the unit of work were dependent will be reflected in the SQL cache and catalogue tables and will therefore be visible to other applications. For this reason, the COMMIT execution causes the application list of modified database entities to be freed. Another definition of the end of a unit of work is the ROLLBACK WORK statement which causes a rollback of all statements in the unit of work (in the example of FIG. 3, all statements in blocks 42, 44, 46). This results in each entry on the application list of nonshareable sections to be deleted since the catalogue table changes upon which the SQL DML statements were dependent have been rolled back and removed from the database. The Rollback also causes the list of modified database entities to be freed.

If a statement savepoint is rolled back, then all entries on the list of modified entities that occur after the entry pointed to by the statement savepoint modified entities pointer are removed. No entries are removed from the list of non-shareable sections as none could have been added since a statement that affects database entities is by definition a DDL statement and not shareable.

If an application savepoint is rolled back, then all entries on the list of modified entities that occur after the entry pointed to by the application savepoint modified entities pointer are removed. The list of non-shareable sections is traversed and all entries added after this application savepoint, as indicated by the value of savepoint identifier stored in each entry, are removed from the SQL cache.

Although a preferred embodiment of the present invention has been described here in detail, it will be appreciated by those skilled in the art, that variations may be made thereto, without departing from the spirit of the invention or the scope of the appended claims.

What is claimed is:

1. A relational database management system comprising a cache for the storage of query sections corresponding to and compiled from query statements, the relational database management system further comprising:
   an identification list for a current unit of work for an application, the identification list storing database entity identifiers corresponding to database entities altered by statements issued in the current unit of work; and
   a cache manager for identifying and marking the query sections compiled after the issuing of the statements in the current unit of work, where the shareable status of a query section is determined by comparing data dependencies returned by the compiler for the query section with the database entity identifiers found on the identification list, wherein if a match is found between the data dependencies and the database entity identifiers, the query section is considered not shareable with other query statements during the current unit of work.

2. The relational database management system of claim 1, further comprising an application list for the current unit of work, the application list comprising entries corresponding to query sections added to the query cache which ate non-shareable.

3. The relational database management system of claim 2 in which each entry in the application list further comprises a reference to the current active savepoint.

4. The relational database management system of claim 3 in which the cache manager is responsive to a savepoint rollback to remove from the cache all entries on the application list added after the savepoint is responsive to a unit of work rollback to remove from the cache all entries on the application list and in which the cache manager is responsive to a work commit to make shareable all entries on the application list.

5. The relational database management system of claim 4 wherein the statements in the current unit of work comprise DDL statements.

6. The relational database management system of claim 5 wherein query section comprises SQL sections.

7. A computer program product for use with a computer comprising a central processing unit and random access memory, said computer program product comprising a computer usable medium having computer readable code means embodied in said medium providing for the determination of shareable query sections in a cache in a relational database management system, said computer program product comprising:
   computer readable program code means for implementing an identification list for a current unit of work for an application, the identification list storing database entity identifiers corresponding to database entities altered by statements issued in the current unit of work, and
   computer readable program code means for identifying and marking the query sections, compiled after the issuing of the statements in the current unit of work, which are non-shareable with other applications during the current unit of work, where the shareable status of a query section is determined by comparing data dependencies returned by the compiler for the query section with the database entity identifiers found on the identification list.

8. The computer program product of claim 7, further comprising computer readable program code means for implementing an application list for the current unit of work, the application list comprising entries corresponding to query sections added to the SQL cache which are non-shareable.

9. The computer program product of claim 8 in which each entry in the application list further comprises a reference to the current active savepoint.

10. The computer program product of claim 9 in which the cache manager is responsive to a savepoint rollback to remove from the cache all entries on the application list added after the application savepoint, is responsive to a unit of work rollback to remove from the cache all entries on the application list and in which the cache manager is responsive to a work commit to make shareable all entries on the application list.

11. The relational database management system of claim 10 wherein the statements in the current unit of work comprise DDL statements.

12. The relational database management system of claim 11 wherein query sections comprises SQL sections.

13. A method for providing shareable dynamic SQL statements during a unit of work for requests in a relational database management system, the relational database management system comprising a cache for the storage of query sections corresponding to query statements, the method comprising:
   providing an identification list for a current unit of work for an application, the identification list storing database entity identifiers corresponding to database entities altered by statements issued in the current unit of work; and
   identify and marking the query sections compiled after the issuing of the statements in the current unit of work, where the shareable status of a query section is determined by comparing data dependencies returned by the compiler for the query statement with the database entity identifiers found on the identification list, wherein if a match is found between the data dependencies and the database entity identifiers, the query section is considered not shareable with other query statements during the current unit of work.

14. The method of claim 13, further comprising providing an application list for the current unit of work, the application list comprising entries corresponding to query sections added to the query cache which are nonshareable.

15. The method of claim 14 wherein each entry in the application list further comprises a reference to the current active savepoint.

16. The method of claim 15 wherein a savepoint rollback causes the removal from the cache all entries on the application list added after the savepoint is responsive to a unit of work rollback to remove from the cache all entries on the application list and wherein the cache manager is responsive to a work commit to make shareable all entries on the application list.

17. A method for sharing dynamic SQL statements during a current unit of work for requests in a relational database management system, the method comprising:

receiving a query statement;

if a compilation environment for the received query statement is the same as a stored compilation environment for a cached query section, using the cached query section as a compiled query section for the received query statement if the cached query section is identified as shareable during the current unit of work, wherein the cached query section is marked as shareable or not shareable by checking an identification list of database entity identifiers corresponding to database entities altered by statements issued in the current unit work;

if the compilation environment for the received query statement is not the same as a stored compilation environment for the cached query section, or if the cached query section is identified as not shareable during the current unit of work, then compiling the received query statement into the compiled query section for the query statement; and using the compiled query section for the received query statement to satisfy the received query statement.

* * * * *

UNITED STATES PATENT AND TRADEMARK OFFICE
CERTIFICATE OF CORRECTION

PATENT NO.    : 6,615,214 B1                                           Page 1 of 1
DATED         : September 2, 2003
INVENTOR(S)   : Paul M. Bird et al.

It is certified that error appears in the above-identified patent and that said Letters Patent is hereby corrected as shown below:

Column 1,
Line 15, "DB2Ô" should read -- DB2 --
Line 19, "SQL.cache" should read -- SQL cache --

Column 7,
Line 51, "ate" should read -- are --

Signed and Sealed this

Fourth Day of November, 2003

JAMES E. ROGAN
*Director of the United States Patent and Trademark Office*